United States Patent
Wexler et al.

(10) Patent No.: US 12,537,700 B2
(45) Date of Patent: Jan. 27, 2026

(54) SECURED BLOCKCHAIN TRANSFER WITH INSECURE ENTITIES

(71) Applicant: Capital One Services, LLC, McLean, VA (US)

(72) Inventors: Noah Wexler, Owings Mills, MD (US); David Short, McLean, VA (US); Kimberly Stockley, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 388 days.

(21) Appl. No.: 18/160,282

(22) Filed: Jan. 26, 2023

(65) Prior Publication Data

US 2024/0259221 A1 Aug. 1, 2024

(51) Int. Cl.
 *H04L 9/00* (2022.01)
 *H04L 9/30* (2006.01)
 *H04L 9/32* (2006.01)

(52) U.S. Cl.
 CPC .............. *H04L 9/50* (2022.05); *H04L 9/30* (2013.01); *H04L 9/3247* (2013.01)

(58) Field of Classification Search
 CPC ......... H04L 9/50; H04L 9/30; H04L 9/32474; H04L 9/3239
 See application file for complete search history.

(56) References Cited

U.S. PATENT DOCUMENTS

| | | | |
|---|---|---|---|
| 11,170,092 B1* | 11/2021 | Liang | H04L 9/0637 |
| 2012/0089686 A1* | 4/2012 | Meister | H04L 51/212 |
| | | | 709/206 |
| 2020/0076601 A1* | 3/2020 | Tabrizi | H04L 9/0637 |
| 2021/0383334 A1* | 12/2021 | Krasnyansky | G06Q 20/02 |
| 2022/0191235 A1* | 6/2022 | Ni | G06F 16/245 |
| 2023/0198785 A1* | 6/2023 | Henning | G06Q 20/36 |
| | | | 380/28 |
| 2024/0113901 A1* | 4/2024 | Johar | H04L 9/50 |
| 2024/0214215 A1* | 6/2024 | Geng | H04L 9/3247 |

\* cited by examiner

*Primary Examiner* — Phy Anh T Vu
(74) *Attorney, Agent, or Firm* — Foley & Lardner LLP

(57) ABSTRACT

A method and related system operations include receiving, from a first user device of a first user, a request indicating an off-chain identifier associated with a second user and a resource for the second user. The method also includes generating and sending a link to the second user based on the request. The method also includes obtaining, based on the link being activated at a second user device of the second user, a signed code signed with a first key via a signing application. The method also includes sending, based on authentication of the signed code, to a blockchain system, a signed message indicating a transfer of the resource from a source blockchain address to a target blockchain address. The method also includes storing, based on the authentication of the signed code, the off-chain identifier and the target blockchain address in association with one another.

19 Claims, 3 Drawing Sheets

SECURED BLOCKCHAIN TRANSFER WITH INSECURE ENTITIES

SUMMARY

Blockchains are generally public databases distributed across multiple computing devices that can provide a record of traceable, immutable records of various types of digital resources. Such digital resources may include cryptocurrency tokens and non-fungible tokens (NFTs). However, the security of records only extends so far as the legitimacy of the records themselves and offers no protection with respect to the identity of an asset sender or receiver. Moreover, pre-existing transfers of digital resources require that a resource recipient have access to a blockchain address for authentication and security purposes. However, a lack of knowledge on whether the recipient already has a blockchain address or regarding the actual identity of the recipient may impede mass adoption of blockchain-related technologies. Thus, while on-chain resources may be possible to transfer, issues related to authentication by non-on-chain users (who do not have an existing on-chain presence) can prevent the practical transfer of blockchain resources.

Some embodiments may facilitate such client-side authentication related to an on-chain resource for a target off-chain identifier. Some embodiments may receive a request that identifies a target off-chain identifier associated with a second user and a resource for the second user from a first user device of a first user, where the off-chain identifier may be an off-chain address such as an email address. In many cases, the request does not include the target blockchain address. After receiving the request, some embodiments may generate a uniform resource locator (URL) that identifies a mobile signing application, a code to be signed via the mobile signing application, and an instruction to sign the code using a target private key associated with a target blockchain address of the second user. Some embodiments may then send the URL to the off-chain identifier or to an address linked to the off-chain identifier.

The second user may then use whatever device received the URL to interact with a set of user interface (UI) elements of a mobile signing application to sign the code and then send the signed code to be received by a server or application executed by a distributed computing service. Some embodiments may send the URL to the second user via the target off-chain identifier and the URL being activated at a second user device of the second user, obtaining, via the mobile signing application on the second user device, the signed code created by signing the code with the target private key, wherein the URL is configured to launch the mobile signing application at the second user device and provide the code and the instruction to the mobile signing application.

Some embodiments may then authenticate the signed code with a target public key that is associated with the target blockchain address. After this authentication, some embodiments may then submit, to a blockchain, a signed message that identifies a transfer of the resource from a source blockchain address of the first user to the target blockchain address of the second user. The signed message may be signed with a source private key associated with the source blockchain address of the first user. Some embodiments may then store the target off-chain identifier and the target blockchain address in association with one another on an off-chain database. For example, some embodiments may map the target off-chain identifier to the target blockchain address in the off-chain database.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

BRIEF DESCRIPTION OF THE DRAWINGS

Detailed descriptions of implementations of the present technology will be described and explained through the use of the accompanying drawings.

Figure 1:
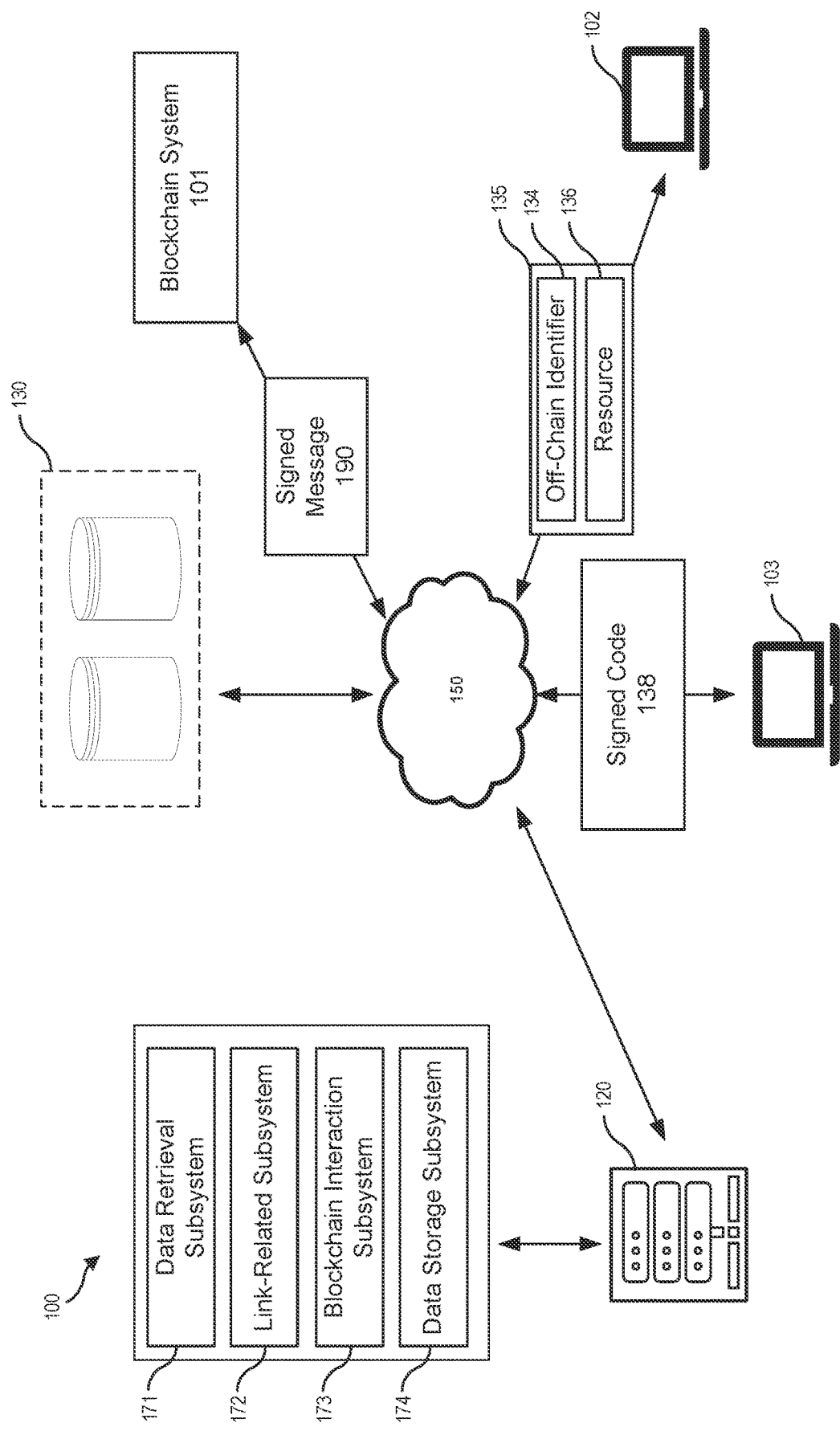
FIG. 1 is a block diagram illustrating a portion of an example blockchain system that records transfers of users, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIG. 1 is a block diagram illustrating a portion of an example blockchain system 101 that records transfers of users, in accordance with some embodiments. A blockchain system 101 includes a first client computing device 102 used by a first user and a second client computing device 103 used by a second user. While shown as a laptop computer, it should be noted that the first client computing device 102 or the second client computing device 103 may include other types of computing devices such as a desktop computer, a wearable headset, a smartwatch, another type of mobile computing device, etc. In some embodiments, the client computing devices 102-103 may communicate with various other computing devices via a network 150, where the network 150 may include the Internet, a local area network, a peer-to-peer network, etc.

The client computing devices 102-103 may send and receive messages through the network 150 to communicate with a server 120 or other computing systems. For example, the first client computing device 102 may send a request 135 that includes an off-chain identifier 134 and an on-chain resource 136 to be received and processed by the server 120. As used in this disclosure, unless otherwise indicated, the terms "on-chain resource" and "resource" may be used interchangeably. The server 120 may include a set of non-transitory, computer-readable media (e.g., "storage media") storing program instructions to perform one or more operations of subsystems 171-174. While one or more operations are described herein as being performed by particular components of the system 100, those operations may be performed by other components of the system 100, a cloud computing service, or another distributed computer service. For example, one or more operations described in this disclosure as being performed by the server 120 may instead be performed by a cloud computing service. Furthermore, some embodiments may communicate with an application program interface (API) of a third-party data service via the network 150 to perform a learning model training operation, obtain machine learning model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as data associated with resources, resource identifiers, user identifiers, historical records associated with users, machine learning model parameters, machine learning model outputs, etc. For example, data objects of the set of databases 130 may include names, e-mail addresses, other off-chain identifiers, keys, values derived from keys (e.g., a blockchain address derived from a key), etc. Furthermore, the system 100 may communicate with or otherwise effect changes on blockchain system 101, as described elsewhere in this disclosure.

In some embodiments, a data retrieval subsystem 171 may receive requests such as the request 135 from a user that indicates the on-chain resource 136 and the off-chain identifier 134 associated with a second user. The data retrieval subsystem 171 may receive the request 135 from a client-side application operating on a first client computing device 102. Some embodiments may then retrieve a first user record of the first user from the databases 130 based on information provided by or in association with the request 135. The first user record may indicate whether the first user has pre-existing access to a blockchain address, such as by having access to a crypto wallet application that provides access to the blockchain address. If the first user is not linked with a blockchain address, the data retrieval subsystem 171 may either generate a new blockchain address and add in the blockchain address to the user record or link the user record to a shared blockchain address that is shared with other users.

The data retrieval subsystem 171 may then perform operations to determine whether to provide access to a new blockchain address or an existing blockchain address associated with the off-chain identifier 134. For example, some embodiments may search through a database of the set of databases 130 to detect that the off-chain identifier 134 is already associated with a blockchain address of a blockchain and assign the associated blockchain address a target blockchain address. Alternatively, some embodiments may search through the set of databases 130 and determine that no known address is associated with the off-chain identifier 134. Some embodiments may then create a crypto wallet application instance associated with a new blockchain address, initialize a smart contract associated with a new blockchain address, or initialize another means of transferring resources on a blockchain from the blockchain address of the first user to the blockchain address of a second user identified by or otherwise associated with the off-chain identifier 134.

In some embodiments, a link-related generation subsystem 172 may generate a link message and provide a link destination. The link-related generation subsystem 172 may also send the link message to the off-chain identifier 134 if the off-chain identifier 134 is a message address, such as an e-mail address or a unique identifier of a messaging platform. In some embodiments, the link-related generation subsystem 172 may generate the link message as a uniform resource locator (URL) that identifies a signing application that may be installed on the second client computer device 103 and instructions that update to sign a code using a key. For example, if the application name "APP251" is registered as an identifier of a corresponding application installed on an operating system of the second client computer device 103, some embodiments may send a URL that includes the name "APP251." Upon receipt of the link, the second client computer device 103 may then initialize the application "APP251" or otherwise switch to the context of the application "APP251."

In some embodiments, a recipient user of the second client computer device 103 may interact with the link generated by the link-related generation subsystem 172, which may cause the second client computer device 103 to display a link destination. In some embodiments, the link destination may be displayed as a page of a web browser. Alternatively, or in addition, the link destination may be displayed in a UI on a native application. In some embodiments, a recipient user of the second client computer device 103 may use the link destination to generate a signed code 138 based on a private key accessible to the recipient user. For example, after the second client computer device 103 receives a URL sent to an e-mail address of a recipient user that is logged into the second client computer device 103, the recipient user may access the URL destination and be directed to a web page which permits the recipient user to type in, paste in, or otherwise provide a private key to indicate that they have access to a target blockchain address. Some embodiments may use a web browser or an application executed in the web browser as a signing application to provide information usable to verify that the recipient user has access to the blockchain address.

Alternatively, a user of the second client computer device 103 may use a first link destination to provide a set of parameters that causes a third-party system to indicate an association between the user and a blockchain address as well as verify access to the blockchain address. For example, after the second client computer device 103 receives a URL sent to an e-mail address of a user that is logged into the second client computer device 103, the user may access the URL destination and select a UI element that redirects the user to a second link destination that causes the presentation of a signing application or opens a second application for use as a signing application. For example, some embodiments may access the URL to cause the signing application to navigate to a deep link destination of the signing application. Some embodiments may populate one or more fields of the signing application based on information stored in the first link, the second link, another message sent to the signing application, or information that is stored on the second client computer device 103. In some embodiments, a recipient user of the second client computer device 103 may then submit information provided via the signing application to a third-party system. The third-party system may then send, to the link-related generation subsystem 172, a version of signed code indicating an association between the recipient user and a blockchain address that may be used as a target blockchain address to receive the on-chain resource 136.

In some embodiments, the blockchain interaction subsystem 173 may obtain a response from the second client computer device 103 that includes the signed code 138. Alternatively, the blockchain interaction subsystem 173 may receive a message from a third-party system that includes signed code associated with a target blockchain address. For example, the blockchain interaction subsystem 173 may receive a message including signed code from a Coinbase® server indicating that an off-chain identifier 134 is registered or otherwise associated with a target blockchain address of the message.

The blockchain interaction subsystem 173 may authenticate the signed code 138 using a public key associated with the target blockchain address. In response to authenticating the signed code 138, the blockchain interaction subsystem 173 may then send a signed message 190 that causes a transfer indicated by the on-chain resource 136. The signed message 190 may be signed with a private key associated with the first user of the first client computing device 102 and may indicate a target blockchain address of the second user associated with the off-chain identifier 134. Furthermore, some embodiments may use the blockchain interaction subsystem 173 to generate a source blockchain address of a resource-sending user or select a source blockchain address from a pool of blockchain addresses to transfer an on-chain resource from the selected source blockchain address, as described elsewhere in this disclosure. The blockchain interaction subsystem 173 may further perform operations such as generating a signed message based on a private key of the source blockchain address ("source key").

In some embodiments, the data storage subsystem 174 may store the off-chain identifier 134 in association with a target blockchain address in a database of the databases 130. For example, the data storage subsystem 174 may map a target blockchain address with the target off-chain identifier 134 in a SQL database of the databases 130. Furthermore, some embodiments may store other information and associate the other information with the off-chain identifier, such as transaction information, information collected from an oracle of the blockchain system 101, or information retrieved for a third-party computer system or service.

Figure 2:
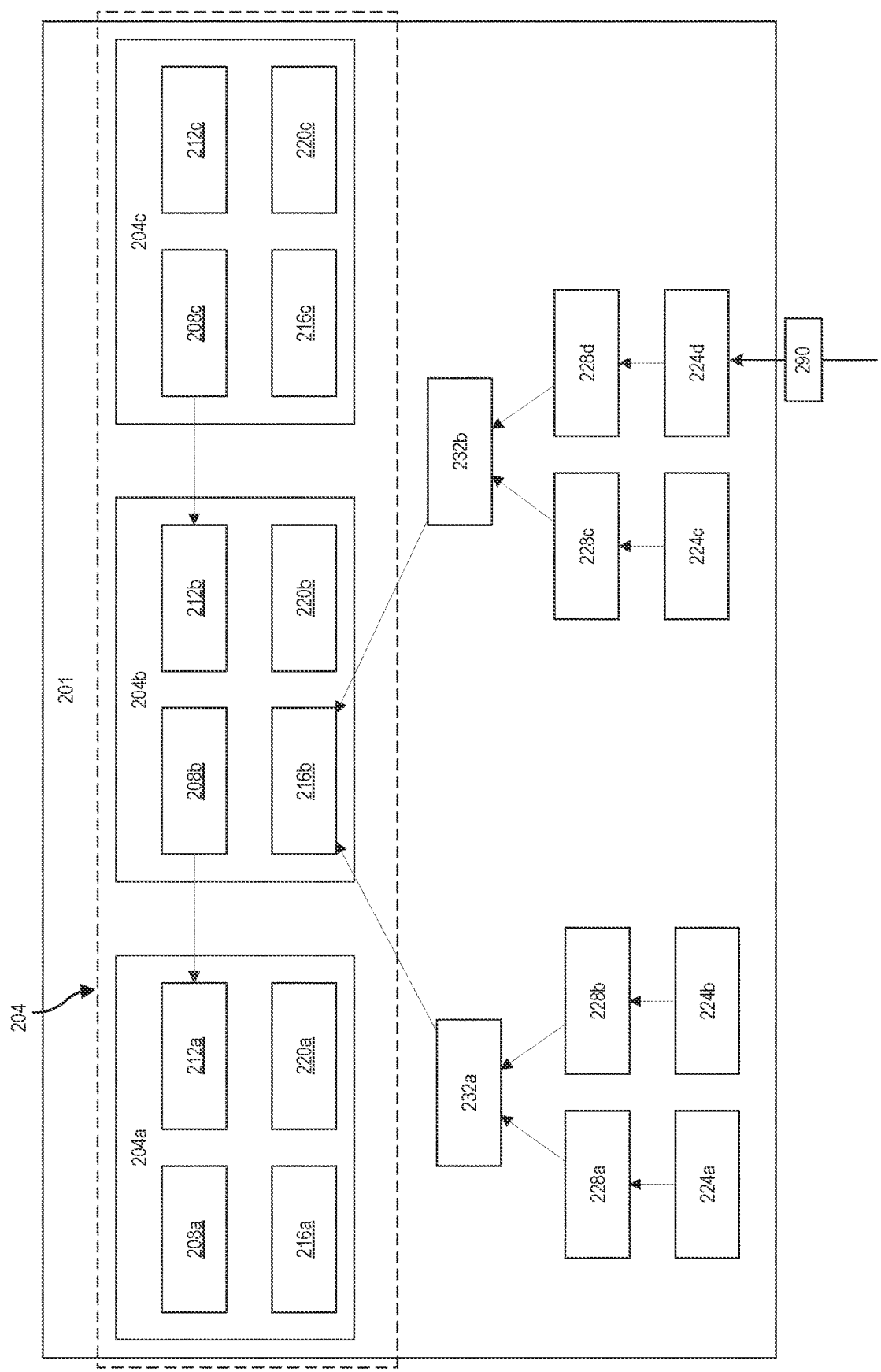
FIG. 2 is an example blockchain system that records transfers of resources, in accordance with some embodiments.

FIG. 2 is an example blockchain system that records transfers of resources, in accordance with some embodiments. In some embodiments, a blockchain system 201 includes a blockchain 204. The blockchain 204 is a distributed database that is shared among multiple nodes (e.g., computers) of a blockchain network, where the multiple nodes may include the server 220 or may be independent of the server 220. The terms "blockchain" and "chain" are used interchangeably herein. As a database, the blockchain 204 stores information electronically in a digital format. In some embodiments, blockchain 204 collects information together in groups, known as "blocks," where such blocks may include an earlier block 204a, a middle block 204b, and a later block 204c. The blockchain 204 may store records of transactions for on-chain resources such as Bitcoin, Ethereum, NFTs, etc. The blockchain 204 may act as a distributed ledger of transactions that is maintained by a blockchain system 201. In some embodiments, the blockchain system 201 implements storage of an identical blockchain at each node, even when nodes receive transactions in different orderings.

The blockchain 204 structures its data into blocks that are strung together. Blocks such as the earlier block 204a, the middle block 204b, or the later block 204c may have limited storage capacities that, when filled, are closed and linked to a previously filled block. For example, once the middle block 204b is filled, it may be linked to the earlier block 204a, where such an arrangement of blocks may form a part of the blockchain 204. Similarly, additional information stored in the later block 204c may eventually be linked to the middle block 204b using a similar operation once the later block 204c is filled.

Each block of the blockchain 204 can represent one or multiple transactions and can include a cryptographic hash of the previous block. For example, a hash 208c may link to the middle block 204b, a hash 208b may link to the earlier block 204a, and a hash 208a of the earlier block 204a may link to an even earlier block that is not shown. Each respective block of the blockchain 204 may include a respective timestamp of the set of timestamps 212a-c, where the respective timestamp indicates a time associated with the respective block. Each respective block of the blocks 204a-c may also include a respective transactions root hash of the set of transactions root hashes 216a-c, where a transactions root hash may indicate the proof that its respective block contains all the transactions in the proper order. Each respective block of the blocks 204a-c may include a respective nonce of the set of nonces 220a-c, where each respective nonce may include any generated random or semi-random number usable during proof of work (PoW) mining or other blockchain operations.

Some embodiments may submit a signed message 290 to the blockchain system 201 to create a transaction 224d and add the transaction 224d to a stack of transactions in a middle block 204b. The transaction 224d may represent a transfer or reallocation operation of an on-chain resource, such as an amount of a digital token, an NFT, etc. The transaction 224d may be one of transactions 224a-d, where each leaf node of leaf nodes 228a-d contains a hash corresponding to the transactions 224a-d respectively. The transaction 224d may represent a transfer of a resource from a first user's blockchain address to a target user's blockchain address. For example, the transaction 224d may include a public key indicating a target user's blockchain address and may be digitally signed by the first user's private key. Hashes of the leaf nodes 228a-d may be used as inputs to generate hashes of non-leaf nodes 232a and 232b, respectively. Each hash of the non-leaf nodes 232a-b may then be used to generate the transactions root hash 216b that is contained in the middle block 204b.

Some embodiments may initialize or update an on-chain application. For example, the blockchain 204 may use a set of on-chain applications (i.e., smart contracts) to enable more complex transactions. An on-chain application includes computer code that can be executed on a secure platform, such as an Ethereum platform, where the code may record transactions (e.g., 224a-d) in blockchains. The computer code may exist across a distributed, decentralized blockchain network and may execute concurrently across different nodes.

Some embodiments may update the state of an on-chain application in response to receiving signed code or otherwise receiving information validating that an off-chain identifier of a request is associated with a target blockchain address. In some embodiments, a signed message that causes the creation of the transaction 224d may be sent via the on-chain application. For example, an update to the on-chain application may trigger a set of program instructions of the on-chain application to send a message signed with the private key of a resource-sending user to create the transaction 224d.

Figure 3:
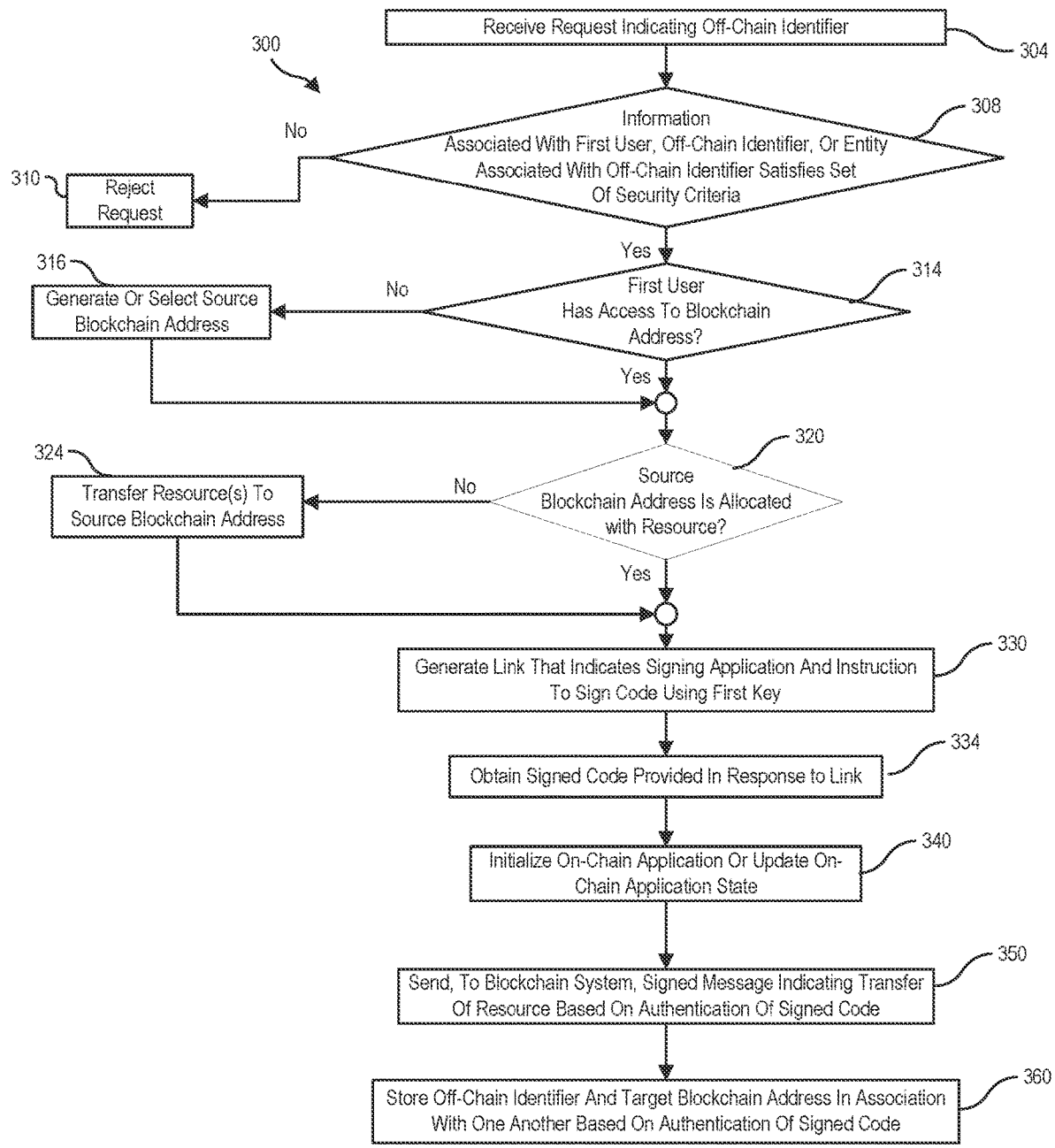
FIG. 3 shows a flowchart of an exemplary method for transferring resources via a blockchain based on a target off-chain identifier, in accordance with one or more embodiments.

FIG. 3 shows a flowchart of an exemplary method 300 for transferring resources via a blockchain based on a target off-chain identifier, in accordance with one or more embodiments. Some embodiments may receive a request indicating a target off-chain identifier, as indicated by block 304. In some embodiments, the off-chain identifier that is being targeted may be provided by a first user that is providing the off-chain identifier from an application that is being executed by a first computing device. For example, the first user may type in an email address as an off-chain identifier and press a UI element of an application to submit a request from the computing device that identifies the email address. The request may include additional information, such as information associated with the first user, or information associated with a command. For example, the request may include a set of text indicating the first user's reason for initiating the request, one or more identifiers to authenticate the request, additional conditions to associate with the request, etc.

The request may include a specific resource or an amount of a resource for transfer. The resource may be a non-fungible token, an amount of Bitcoin to transmit, or another type of digital asset. For example, some embodiments may receive a request that includes a target user's e-mail in a first field and indicates an amount of Bitcoin to transfer to the target user. As described elsewhere in this disclosure, some embodiments may then send a message to the target user via the target user's e-mail.

Some embodiments may determine whether information associated with the first user, the off-chain identifier, or an entity associated with the off-chain identifier satisfies a set of security criteria, as indicated by block 308. In some embodiments, the set of security criteria described by block 308 requires satisfaction in order for the exemplary method 300 to proceed with additional operations to transfer digital assets from a first blockchain address to a second blockchain address. The information may be provided by a user that provided the request, such as provided by the user during a same data session used to provide the request.

In some embodiments, information associated with a user may include user-related information about an individual, an organization, another entity, etc. The user-related information may include names, physical addresses, aliases, associated blockchain addresses, text information indicating a reason for the request, etc. For example, some embodiments may obtain second user-related information about a second user with a request or otherwise in association with the request, where the information may include a name, date, reason for the request, a location at which the request was made, etc. Furthermore, some embodiments may be used for validation operations or identity-matching operations.

Some embodiments may also determine the off-chain identifier is in a set of approved identifiers and, in response, directly transfer an identified on-chain resource to a blockchain address mapped to the approved off-chain identifier without performing operations to generate a link as described for block 330. If the off-chain identifier is not in the set of approved identifiers, some embodiments may proceed to perform operations such as generating a link as described for block 330. Furthermore, some embodiments may determine whether the target identifier has been flagged in a list of forbidden identifiers. Some embodiments may access a database that includes forbidden identifiers, where the forbidden identifiers may have been flagged by another user as associated with fraud or some other type of malicious activity. For example, some embodiments may obtain a list of users or blockchain addresses previously associated with malicious activity and identifiers of those users or blockchain addresses, where the identifiers may include names, hashed sequences, or other types of identifying values.

Alternatively, some embodiments may determine whether the target identifier matches a record of approved identifiers. For example, some embodiments may store a set of records holding information of off-chain identifiers that have been approved as valid recipients of a digital asset. Some embodiments may then permit transfers to a blockchain address that has been pre-associated with the valid recipient based on a blockchain address stored in association with the valid recipient. Some embodiments may then send a link to the off-chain identifier or a message recipient address determined based on the off-chain identifier as described elsewhere in this disclosure. Furthermore, while some embodiments may store a blockchain address with an approved identifier, some embodiments may store an approved identifier that is not associated with a blockchain address and may perform other operations to determine a blockchain address associated with the approved identifier. For example, some embodiments system may have previously encountered a recipient user's e-mail and stored a corresponding target blockchain address in association with the e-mail. Some embodiments may then generate a signed message based on the previously stored target blockchain address without requiring the second user's signing application.

Some embodiments may receive multiple requests indicating a target identifier and compare these requests or the target identifier with a history of requests. For example, some embodiments may use a machine learning model to generate a set of vectors, where each respective vector of the set of vectors is generated from a different request. Some embodiments may then provide the set of vectors and their associated indicators of malicious activity to a machine learning model to train the machine learning model to detect whether a request is associated with malicious activity. Some embodiments may then tag any identifiers associated with a request identified as malicious and add the identifier to the database as a forbidden identifier.

In response to a determination that the target off-chain identifier is in the list of forbidden identifiers, some embodiments may reject a request. Rejecting a request may include rejecting commands made or caused by the request. For example, rejecting a request that indicates a target off-chain identifier and an on-chain resource to be transferred that would normally cause some embodiments to transfer the on-chain resource to an on-chain address associated with the target off-chain identifier may include preventing or canceling instructions to transfer the on-chain resource to the on-chain address. Some embodiments may send a warning to a device that sent the request. For example, some embodiments may send a warning to a user indicating that a target off-chain identifier provided by the user is associated with malicious activity. In some embodiments, the user may be able to provide a confirmation message indicating that they have received the warning and still wish to proceed with executing the transaction.

In response to a determination that the target off-chain identifier is in the list of forbidden identifiers, operations of the exemplary method 300 may proceed to block 310. Otherwise, operations of the exemplary method 300 may proceed to operations described by block 314, block 320, block 330, or another operation associated with resource transfer that is not block 310.

Some embodiments may reject a request, as indicated by block 310. Rejecting a request may include rejecting commands made or caused by the request. For example, rejecting a request that indicates a target off-chain identifier and a resource to be transferred that would normally cause some embodiments to transfer the resource to an on-chain address associated with the target off-chain identifier may include preventing or canceling instructions to transfer the resource to the on-chain address. Some embodiments may send a warning to a device that sent the request. For example, some embodiments may send a warning to a user indicating that a target off-chain identifier provided by the user is associated with malicious activity. In some embodiments, the user may be able to provide a confirmation message indicating that they have received the warning and still wish to proceed with executing the transaction.

Some embodiments may determine whether the first user has access to a blockchain address, as indicated by block 314. Some embodiments may permit a user to transfer a digital asset or other resource that the user does not immediately have access to. For example, some embodiments may access an off-chain database of user records to search for a first user record of a first user that submitted a request to transfer a first resource. Some embodiments may then detect, based on information in the user record, that the user does not have access to a crypto wallet application or otherwise have access to a blockchain address on an established blockchain, such as the Ethereum network.

In response to a determination that the user does not have access to their own blockchain address, some embodiments may proceed to operations described by block 316. Otherwise, operations of the exemplary method 300 may proceed to operations described by block 320.

Some embodiments may generate or select a source blockchain address, as indicated by block 316. Some embodiments may perform different types of operations to determine a source blockchain address based on different implementations, where control of transfers from the source blockchain address may require access to a source private key. As used in this disclosure, an application or user may have access to a source blockchain address if they have access to the corresponding source private key of the source blockchain address. For example, based on a determination that a user does not have access to any blockchain addresses (e.g., does not have access to a crypto wallet application), some embodiments may receive instructions to create a new crypto wallet account for the user. In some embodiments, these instructions to create the new account may include another off-chain identifier, where access to the crypto wallet account of a crypto wallet application may be accessible via a message sent to the off-chain identifier or an address associated with the off-chain identifier. As used in this disclosure, a crypto wallet application may be associated with a blockchain address, where the crypto wallet application may be any application that provides a user with access to a blockchain address or effect on-chain changes related to the blockchain address (e.g., by transferring digital assets from one blockchain address to another blockchain address).

Alternatively, or in addition, some embodiments may select a blockchain address for use as the source blockchain address from a plurality of available blockchain addresses. In some embodiments, a pool of blockchain addresses may represent a corresponding pool of crypto wallets. In some embodiments, each respective blockchain address of the pool of blockchain addresses may be associated with a corresponding respective resource and amount of the resource. Some embodiments may select the source blockchain address randomly or based on a set of rules, such as selecting a blockchain address that is allocated with the greatest amount of a digital asset. For example, some embodiments may select from a set of three blockchain addresses and choose the blockchain address that has the greatest amount of Bitcoin stored in the blockchain address for use as a source blockchain address. In some embodiments, the plurality of blockchain addresses that are selected may be regularly repopulated with additional digital assets obtained from an external system.

Some embodiments may determine whether the source blockchain address is allocated with the resource to be transferred, as indicated by block 320. As described elsewhere in this disclosure, different types of resources may be transferred, where a resource may include an amount of a token. Some embodiments may determine that a source blockchain address has not been allocated with a resource based on a determination that the amount to be transferred as indicated by a request is insufficient. For example, a first user may submit a request to transfer 30 Ethereum tokens. Some embodiments may then determine that the source blockchain address has not been allocated with this resource because the amount of Ethereum allocated to this source blockchain address is less than 30. Alternatively, or in addition, some embodiments may receive a request to transfer a specific non-fungible token and determine that the source blockchain address has not been allocated with this resource based on a determination that the non-fungible token is not allocated to the source blockchain address.

Some embodiments may transfer a set of resources to the source blockchain address, as indicated by block 324. Some embodiments may transfer the set of resources to the source blockchain address in order to ensure that the target amount that should be transferred to another blockchain address associated with a target off-chain identifier is actually allocated to the source blockchain address before being sent from the source blockchain address. For example, after a first user submits a request to transfer a first amount of a digital asset from a source blockchain address of the first user's, some embodiments may then determine that the source blockchain address does not have at least that amount allocated to the source blockchain address. Some embodiments may then transfer an amount of the digital asset from another source to the source blockchain address such that at least the target amount or more than the target amount of digital asset is allocated to the source blockchain address. For example, some embodiments may select a first blockchain address from a pool of predetermined blockchain addresses, where the first blockchain address has been allocated with 900 Bitcoin. Some embodiments may then transfer two Bitcoin from the first blockchain address to a source blockchain address after a user associated with the source blockchain address provides a request to transfer two Bitcoin from the source blockchain address. Alternatively, or additionally, some embodiments may perform a calculation to determine an amount to transfer to the source blockchain address based on other known restrictions of a source blockchain address. For example, some embodiments may determine that an amount to be sent from a source blockchain address is equal to three tokens, but that the source blockchain address only has two tokens allocated to the source blockchain address. In response, some embodiments may send one extra token to the source blockchain address.

Some embodiments may generate a link that indicates a signing application and an instruction to sign a code using a first key, as indicated by block 330. The link may be sent as a message or a part of a message to a mobile computing device or other computing device, where the mobile computing device may be caused to open a signing application and provide signed code that can later be authenticated with a public key (e.g., a target public key associated with a target blockchain address). The first key may be a target private key associated with a target blockchain address that will act as the recipient address associated with an off-chain identifier of the second user. By receiving the target private key directly from a mobile computing device or indirectly from another operation, some operations may cause a transfer of a digital asset to the target blockchain address. For example, some embodiments may generate a message that includes a URL which identifies an application named "SIGNING_APP1" and send the message to a mobile computing device. The message may cause the mobile computing device to present a set of UI elements that permit a user to provide a blockchain address, a private key, a public key, or other information used in this disclosure.

In some embodiments, the link may be a link to an address of a server that, when accessed by a signing application, causes the signing application to display a new UI screen. In some embodiments, the new UI screen may provide the user with an option to confirm a transfer from a source blockchain address (e.g., either by confirming directly or by first accessing information stored in a crypto wallet application) or otherwise confirm a transfer from a blockchain address. In some embodiments, the UI screen may further display a blockchain address as a transfer destination after a user provides the blockchain address.

In some embodiments, the link sent to a computing device may be a link to a redirection destination that, when accessed by the computing device, will prompt the computing device to open another application, such as the signing application. For example, some embodiments may send a URL that is initially opened by a browser application or a first native application being executed by a mobile computing device. After the mobile computing device attempts to access the destination of the link, the mobile computing device may be caused to display a prompt to the user requesting that the user permit access to a second native application, where the second native application may then be used as a signing application. For example, some embodiments may obtain a link, and access a link destination of the link, where the link destination includes parameters that cause the mobile computing device to initialize an instance of a new application.

Some embodiments may generate a message that includes a link that will identify or otherwise indicate a mobile signing application. For example, some embodiments may generate a message that includes an identifier of an application having the name "APP11," where this name may be indicated in a URL of the message or in a field of the message that is separated from the URL. Furthermore, some embodiments may first determine whether a set of transfer limits are satisfied, where the set of transfer limits may be represented by a set of boundaries that vary in accordance with a user-specific score. For example, a first user may be associated with a score equal to "528," and a second user may be associated with a score equal to "529." Some embodiments may then determine a first boundary "900" based on the first score "528" and determine a second boundary "4000" based on the second score "529," where the determined boundaries may correlate with the score. Some embodiments may use a function to compute a boundary based on a score. Alternatively, some embodiments may determine a corresponding bin for a score and then select a boundary based on the corresponding bin. Some embodiments may determine that a resource amount satisfies this boundary (e.g., by being less than or equal to an upper-limit boundary, being greater than or equal to a lower-limit boundary, etc.).

Some embodiments may receive multiple requests indicating a target identifier and compare these requests or the target identifier with a history of requests. For example, some embodiments may use a machine learning model to generate a set of vectors, where each respective vector of the set of vectors is generated from a different request. Some embodiments may then provide the set of vectors and their associated indicators of malicious activity to a machine learning model to train the machine learning model to detect whether a request is associated with malicious activity. Some embodiments may then tag any identifiers associated with a request identified as malicious and add the identifier to the database as a forbidden identifier.

Some embodiments may receive a message from a recipient user identified by or otherwise associated with a target off-chain identifier that indicates that the recipient user does not have a pre-existing blockchain address and does not have access to any other blockchain address. Some embodiments may then generate a new target blockchain address for the recipient user and a corresponding private key or may send instructions to a computing device of the recipient user to perform such operations for local storage. Some embodiments may then receive a signed code based on the generated new target blockchain address and corresponding generated private key.

Some embodiments may obtain a signed code that is provided in response to the link, as indicated by block 334. After providing a user device with a link as described for block 330, some embodiments may obtain the signed code via a mobile signing application launched with and operating on the user device. In some embodiments, the link may include a parameter or device-registered value that causes the device to automatically launch a signing application. For example, a recipient user of a user device may directly paste their private key into a UI screen on the user device. The user device may then send the private key to a server that performs one or more operations of the exemplary method 300 based on the received signed code. Alternatively, or in addition, some embodiments may receive the signed code from a third-party entity. For example, after a user device is provided with a link that then causes the user device to display a UI screen requesting information from a recipient user, the recipient user may select a UI element identifying a third-party service. The user device may then send a message to a third-party service directly or after an interaction with a second application operating on the user device that is being used as a signing application. Some embodiments may then receive signed code provided by the third-party service or another application that is triggered by the third-party service.

Some embodiments may initialize an on-chain application, as indicated by block 340. Some embodiments may initialize an on-chain application on a blockchain network such as the Ethereum network, where the on-chain application may perform additional verification operations that permit the transfer of a resource such as a digital asset. In some embodiments, the on-chain application may be initialized before other operations of the exemplary method 300 have begun, where the on-chain application may include one or more off-chain operations. Alternatively, or in addition, the on-chain application may be initialized after receiving a request from a user to transfer a digital asset, generating a link to be sent to a receiving user, or other operations described for the exemplary method 300.

In some embodiments, the initialization of an on-chain application may be triggered by the identification or lack of identification of an off-chain identifier. For example, some embodiments may detect that a target off-chain identifier associated with a target blockchain identifier is not found in an identifier database storing registered identifiers. It should further be understood that, while some embodiments may initialize or update an on-chain application, some embodiments may affect a transfer without using an on-chain application.

In some embodiments, the on-chain application may act as a safety system to verify any transactions in a transparent manner. For example, when sending or receiving digital assets, some embodiments may first allocate the assets to a blockchain address registered to an on-chain application. Some embodiments may then determine that a set of criteria (e.g., set of security criteria, a boundary, etc.) is satisfied before re-transferring the digital asset to a target blockchain address or otherwise transferring resources from a source blockchain address. By using the on-chain application, a target recipient of a resource may receive information on why a proposed transfer was rejected without jeopardizing the trustworthiness of the resource sender. For example, some embodiments may use the on-chain application to use results provided by one or more nodes or oracles to determine whether or not to proceed with an asset transfer. physical location is likely to be a correct representation of the user's actual location. Furthermore, some embodiments may first determine whether the off-chain identifier is associated with any known identifiers of an internal database before initializing an on-chain application and use a result of the internal database query to determine whether to initialize the on-chain application or to update a state of the on-chain application.

In some embodiments, the on-chain application may rely on data provided by an off-chain database to determine whether or not to proceed with a transfer operation described in the exemplary method 300. After receiving the signed code, some embodiments may submit a query to an identifier database based on information provided by a user. For example, some embodiments may send a link to an email address, and a user may access the link destination with a user computing device to send signed code to a distributed computing application that performs one or more operations described in this disclosure. In addition to the signed code, the user may also provide additional information, such as a physical address, a name, an identification number, other personally identifying information, security information, a list of previous transactions, etc. Some embodiments may then submit the query to a database or application program interface (API) based on this information provided by the user. For example, some embodiments may send a query to a database, where the query may include parameters such as an off-chain identifier, indicator of a physical location, an internet protocol (IP) address, etc.

Based on resulting information provided by an off-chain database, an oracle, or another data source, some embodiments may update a state of the on-chain application. For example, based on a change in the state of an on-chain application, some embodiments may prevent a transfer of a resource or reverse a transfer of the resource. Furthermore, some embodiments may detect a change in the state of the non-chain application and perform additional operations triggered by a change in state. For example, some embodiments may warn a first user that requested the transfer which triggered the state change, send a message to a second user associated with the target blockchain address to warn the second user, associate the target blockchain address or an identifier of the second user with an anomaly flag in a database, etc.

Some embodiments may receive instructions to perform a set of additional distributed computing operations as part of a transaction involving the on-chain application. For example, some embodiments may include generating a set of seed values for text or image generation operations in addition to initializing a transfer of a digital asset. Some embodiments may perform operations to optimize the performance of distributed computing operations based on a computational cost estimate that may vary over time. Some embodiments may use an oracle that provides the distributed computing cost of a distributed computing operation to obtain a series of distributed computing costs. For example, some embodiments may use an oracle that provides gas price estimates on the Ethereum network based on a number of operations. Some embodiments may then determine that the distributed computing cost satisfies a set of cost criteria, where the set of cost criteria may include a threshold. In response to a determination that the computation cost satisfies the set of criteria at a determined time, some embodiments may then execute the distributed computing operations at the determined time. For example, some embodiments may determine that a computation cost of a set of required computing operations is less than a threshold gas price at a measured duration and, in response, perform the set of required computing operations during or immediately after this measured duration. Some embodiments may implement more sophisticated methods to determine when to initiate a set of distributed computing operations on a blockchain network. For example, some embodiments may determine a local minimum of a series of gas prices.

As described elsewhere, some embodiments may initialize a crypto wallet application or otherwise allocate a new target blockchain address for a second user, wherein the second user may first be provided with a private key to the new blockchain address. In some embodiments, the new target blockchain address may be controlled by an on-chain application or an off-chain application such that the application may access a target blockchain address in addition to a second user. Some embodiments may send a request from the second user to provide a validation value. The validation value may include a required number, binary value, category selection, etc. In response to a determination that an expected validation value was not received by a time threshold, some embodiments may reverse a transfer of resources from the source blockchain address to the target blockchain address and transfer the previously transferred resource from the target blockchain address back to the source blockchain address. By keeping access to a recipient user's private key, some embodiments may force a recipient user to either verify their identity in a more secure fashion at a later time or force user activity that would flag a user as malicious.

Some embodiments may send, to a blockchain system, a signed message indicating a transfer of the resource based on an authentication of signed code, as indicated by block 350. Some embodiments may first authenticate a signed message of a target blockchain address based on a target public key associated with the target blockchain address. In response to a successful authentication, the signed message may be generated based on a private key of a resource-sending user and a blockchain address. In some embodiments, the resource-sending user may have previously supplied a private key for an existing source blockchain address. Alternatively, some embodiments may have generated and stored a private key for a source blockchain address that was generated in response to a determination that a user does not have access to an existing blockchain address.

Some embodiments may use a machine learning model to determine an anomaly score based on a set of transaction records associated with users and then use the anomaly score to determine whether or not to send a signed message. As described elsewhere in this disclosure, some embodiments may use information related to a first user to determine whether or not to transfer a resource over a blockchain, where the first user is the user that sent a request to transfer the resource. Some embodiments may also use information obtained from a second user as inputs to a machine learning model to obtain an anomaly score, where the second user may be the user that provided information concurrently with or in signed code, such as signed code described in operations described in block 334. Some embodiments may use both information related to the first user and the second user concurrently as inputs for a machine learning model to generate an anomaly score, where such information may include transaction information indicating transactions involving addresses associated with the first or second user.

Some embodiments may submit a query to a database based on an off-chain identifier of a user (e.g., the second user) to obtain a set of linked records associated with the target off-chain identifier. The linked records may indicate information such as additional off-chain identifiers or transactions of those additional off-chain identifiers, additional associated blockchain addresses of the off-chain identifier or transactions involving those additional associated blockchain addresses of the off-chain identifier, warnings, or metadata associated with the additional associated blockchain addresses, etc. By using linked records associated with other off-chain identifiers or blockchain addresses, some embodiments may take advantage of patterns determined based on previously detected anomalies to increase the accuracy of new anomaly detection operations. Some embodiments may detect that an off-chain identifier is associated with an anomaly after a first transfer and prevent additional resource transfers to an address of the off-chain identifier. For example, some embodiments may detect a transfer from a target blockchain address to a known forbidden address and, in response, prevent additional transfers to the target blockchain address.

In response to a determination that the anomaly score satisfies the anomaly threshold, some embodiments may perform additional operations to transfer a digital asset described in the exemplary method 300. Otherwise, some embodiments may prevent a signed message from being transmitted that would cause a transfer or associate a warning message with a target blockchain address, a user, or an off-chain identifier.

Some embodiments may store the off-chain identifier and the target blockchain address in association with one another based on the authentication of the signed code, as indicated by block 360. Some embodiments may store the association between the off-chain identifier and the target blockchain address in an off-chain database that is accessible to multiple instances of a set of applications used to perform one or more operations described in this disclosure. For example, some embodiments may determine that a target blockchain address or an on-chain identifier is new and store a new record identifying the target blockchain address, the on-chain identifier, and a value representing an association between the target blockchain address and the on-chain identifier in a SQL database or a key-value database.

Some embodiments may determine a target blockchain address based on a public key, where determining the target blockchain address based on the public key may include determining that the target blockchain address is derived from a hash of the public key. Some embodiments may perform operations to secure this public key such as by encrypting an off-chain identifier and then associating the encrypted off-chain identifier with the public key. By encrypting the off-chain identifier, some embodiments may further increase the security of users.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. The processing devices may include one or more devices configured through hardware, firmware, and/or software to be specifically designed for the execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 171-174 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 171-174 may provide more or less functionality than is described. For example, one or more of subsystems 171-174 may be eliminated, and some or all of its functionality may be provided by other ones of subsystems 171-174. As another example, additional subsystems may be programmed to perform some or all of the functionality attributed herein to one of subsystems 171-174 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

ENUMERATED EMBODIMENTS

The present techniques will be better understood with reference to the following enumerated embodiments:

1. A method comprising: receiving, from a first user device of a first user, a request indicating an off-chain identifier associated with a second user and a resource for the second user; generating and sending, to the second user, based on the request, a link that indicates (i) a signing application and (ii) an instruction to sign a code using a first key associated with a target blockchain address of a blockchain; obtaining, based on the link being activated at a second user device of the second user, a signed code via the signing application, the signed code being signed with the first key; sending, based on authentication of the signed code, to a blockchain system, a signed message indicating a transfer of the resource from a source blockchain address to the target blockchain address; and storing, based on the authentication of the signed code, the off-chain identifier and the target blockchain address in association with one another.

2. A method comprising: in response to receiving, from a first user device of a first user, a request that identifies a target off-chain identifier associated with a second user and a resource for the second user, generating a uniform resource locator (URL) that identifies (i) a mobile signing application, (ii) a code to be signed via the mobile signing application, and (iii) an instruction to sign the code using a target private key associated with a target blockchain address of the second user, wherein the request does not include the target blockchain address; in response to sending the URL to the second user via the target off-chain identifier and the URL being activated at a second user device of the second user, obtaining, via the mobile signing application on the second user device, a signed code created by signing the code with the target private key, wherein the URL is configured to launch the mobile signing application at the second user device and provide the code and the instruction to the mobile signing application; in response to authenticating the signed code using a target public key associated with the target blockchain address: submitting, to a blockchain, a signed message that identifies a transfer of the resource from a source blockchain address of the first user to the target blockchain address of the second user, wherein the signed message is signed with a source private key associated with the source blockchain address of the first user; and storing, on an off-chain database, the target off-chain identifier and the target blockchain address in association with one another by mapping the target off-chain identifier to the target blockchain address in the off-chain database.

3. A method comprising: receiving, from a first user device of a first user, a request that identifies a target off-chain identifier associated with a second user and a resource for the second user; generating and sending, to the second user, based on the request, a uniform resource locator (URL) indicating (i) a signing application and (ii) an instruction to sign a code using a target key associated with a target blockchain address; obtaining, based on the URL being activated at a second user device of the second user, a signed code via the signing application on the second user device, the signed code being signed with the target key; submitting, based on authentication of the signed code, to a blockchain, a signed message indicating a transfer of the resource from a source blockchain address to the target blockchain address, wherein the signed message is signed with a source key associated with the source blockchain address; and storing, based on the authentication of the signed code, the target off-chain identifier and the target blockchain address in association with one another.

4. The method of any of embodiments 1 to 3, wherein: obtaining the signed code comprises obtaining a user-related information of the second user; and storing the target off-chain identifier comprises: determining whether the user-related information satisfies a set of security criteria by sending a query based on the user-related information to a data source via an application program interface (API) of the data source; and storing the target off-chain identifier in response to a determination that the user-related information satisfies the set of security criteria.

5. The method of any of embodiments 1 to 4, wherein the URL causes the second user device to initialize the signing application and navigate to a deep link destination of the signing application, wherein the URL comprises information that populates a field displayed in the deep link destination.

6. The method of any of embodiments 1 to 5, further comprising: receiving instructions to perform a transaction that comprises performing a set of distributed computing operations; obtaining, from an oracle, a distributed computing cost of the set of distributed computing operations; determining whether the distributed computing cost satisfies a threshold; and based on a determination that the distributed computing cost satisfies the threshold, performing the set of distributed computing operations.

7. The method of any of embodiments 1 to 6, further comprising determining, using a machine learning model, an anomaly score based on a set of transaction records associated with the first user, wherein sending the URL comprises sending the URL based on a determination that the anomaly score satisfies an anomaly threshold.

8. The method of any of embodiments 1 to 7, wherein the resource indicates an amount further comprising: retrieving a score associated with the first user from a database of scores; determining a boundary based on the score, wherein a magnitude of the boundary is correlated with the score; determining whether the amount is within the boundary, wherein generating the URL comprises generating the URL based on a determination that the amount satisfies the boundary.

9. The method of any of embodiments 1 to 8, further comprising: sending, to a database, a query based on the target off-chain identifier to retrieve a set of linked records associated with the target off-chain identifier; determining an anomaly score using a machine learning model based on transaction records of the set of linked records, wherein sending the URL comprises sending the URL based on a determination that the anomaly score satisfies an anomaly threshold.

10. The method of any of embodiments 1 to 9, wherein the signed message is a first message, further comprising: determining whether a validation value of the second user is received by a time threshold; and in response to a determination that the validation value is not received by the time threshold, submitting a second message indicating a transfer of the resource from the target blockchain address to the source blockchain address.

11. The method of embodiment 10, further comprising preventing additional resource transfers associated with resources of the target blockchain address.

12. The set of non-transitory, machine-readable media of any of embodiments 1 to 11, wherein the signed message is a first message, the method further comprising: determining whether a user record of the first user indicates that the first user controls access to any blockchain addresses; based on a determination that the first user is not indicated as controlling access to any blockchain addresses, sending a second message indicating a transfer of the resource to the source blockchain address before sending the first message.

13. The set of non-transitory, machine-readable media of any of embodiments 1 to 12, the method further comprising: determining whether the first user is indicated as being associated with any blockchain address of the blockchain; and in response to a determination that the first user is not indicated as being associated with any blockchain address of the blockchain, selecting the source blockchain address of a plurality of available blockchain addresses.

14. The set of non-transitory, machine-readable media of any of embodiments 1 to 13, the method further comprising: obtaining user-related information about the second user from the first user; determining whether the user-related information satisfies a set of security criteria, wherein sending the signed message comprises sending the signed message in response to a determination that the user-related information satisfies the set of security criteria.

15. The set of non-transitory, machine-readable media of any of embodiments 1 to 14, the method further comprising determining whether the off-chain identifier is stored in a set of approved identifiers, wherein sending the link comprises sending the link in response to a determination that the off-chain identifier is not stored in the set of approved identifiers.

16. The set of non-transitory, machine-readable media of any of embodiments 1 to 15, wherein the request is a first request, further comprising: receiving a second request indicating a second identifier; determining whether the second identifier is stored in a list of forbidden identifiers; and in response to a determination that the second identifier is stored in the list of forbidden identifiers, rejecting the second request.

17. The set of non-transitory, machine-readable media of any of embodiments 1 to 16, wherein storing the off-chain identifier and the target blockchain address in association with one another comprises: determining the target blockchain address based on a public key; encrypting the off-chain identifier to obtain an encrypted off-chain identifier; and associating the encrypted off-chain identifier with the public key.

18. The set of non-transitory, machine-readable media of any of embodiments 1 to 17, wherein the off-chain identifier is a first off-chain identifier, further comprising generating the source blockchain address in association with the first user in response to receiving instructions to create a new account of the first user, wherein the instructions indicate a second off-chain identifier.

19. The set of non-transitory, machine-readable media of any of embodiments 1 to 18, wherein sending the signed message comprises: updating a state of an on-chain application in response to receiving the signed code at an address of the on-chain application; and sending the signed message via the on-chain application based on the state of the on-chain application.

20. The set of non-transitory, machine-readable media of embodiment 19, the method further comprising: sending a query to an identifier database storing registered identifiers to determine whether the off-chain identifier is associated with a known identifier of the identifier database; and in response to a determination that the off-chain identifier is not associated with any known identifier of the identifier database, initializing the on-chain application.

21. One or more tangible, non-transitory, machine-readable media storing instructions that, when executed by a set of processors, cause the set of processors to effectuate operations comprising those of any of embodiments 1-20.

22. A system comprising: a set of processors and memory storing computer program instructions that, when executed by the set of processors, cause the set of processors to effectuate operations comprising those of any of embodiments 1-20.

What is claimed is:

1. A system for facilitating target-client-side authentication related to an on-chain resource for target off-chain identifiers, the system comprising a computer system that comprises one or more processors programmed with computer program instructions that, when executed, cause the computer system to perform operations comprising:
in response to receiving, from a first user device of a first user, a request that identifies a target off-chain identifier associated with a second user and a resource for the second user, generating a uniform resource locator (URL) that identifies (i) a mobile signing application, (ii) a code to be signed via the mobile signing application, and (iii) an instruction to sign the code using a target private key associated with a target blockchain address of the second user, wherein the request does not include the target blockchain address, and wherein the resource indicates an amount, and wherein generating the URL further comprises:
retrieving a score associated with the first user from a database of scores;
determining a boundary based on the score, wherein a magnitude of the boundary is correlated with the score;
determining whether the amount is within the boundary; and
generating the URL based on a determination that the amount satisfies the boundary;
in response to sending the URL to the second user via the target off-chain identifier and the URL being activated at a second user device of the second user, obtaining, via the mobile signing application on the second user device, a signed code created by signing the code with the target private key, wherein the URL is configured to launch the mobile signing application at the second user device and provide the code and the instruction to the mobile signing application;
in response to authenticating the signed code using a target public key associated with the target blockchain address:
submitting, to a blockchain, a signed message that identifies a transfer of the resource from a source blockchain address of the first user to the target blockchain address of the second user, wherein the signed message is signed with a source private key associated with the source blockchain address of the first user; and
storing, on an off-chain database, the target off-chain identifier and the target blockchain address in association with one another by mapping the target off-chain identifier to the target blockchain address in the off-chain database.

2. A method comprising:
receiving, from a first user device of a first user, a request that identifies a target off-chain identifier associated with a second user and a resource for the second user, wherein the resource indicates an amount;
retrieving a score associated with the first user from a database of scores;
determining a boundary based on the score, wherein a magnitude of the boundary is correlated with the score;
determining that the amount is within the boundary;
generating and sending, to the second user, based on the request, a uniform resource locator (URL) indicating (i) a signing application and (ii) an instruction to sign a code using a target key associated with a target blockchain address, wherein the generating the URL comprises generating the URL based on a determination that the amount satisfies the boundary;
obtaining, based on the URL being activated at a second user device of the second user, a signed code via the signing application on the second user device, the signed code being signed with the target key;
submitting, based on authentication of the signed code, to a blockchain, a signed message indicating a transfer of the resource from a source blockchain address to the target blockchain address, wherein the signed message is signed with a source key associated with the source blockchain address; and
storing, based on the authentication of the signed code, the target off-chain identifier and the target blockchain address in association with one another.

3. The method of claim 2, wherein:
obtaining the signed code comprises obtaining a user-related information of the second user; and
storing the target off-chain identifier comprises:
determining whether the user-related information satisfies a set of security criteria by sending a query based on the user-related information to a data source via an application program interface (API) of the data source; and
storing the target off-chain identifier in response to a determination that the user-related information satisfies the set of security criteria.

4. The method of claim 2, wherein the URL causes the second user device to initialize the signing application and navigate to a deep link destination of the signing application, wherein the URL comprises information that populates a field displayed in the deep link destination.

5. The method of claim 2, further comprising:
receiving instructions to perform a transaction that comprises performing a set of distributed computing operations;
obtaining, from an oracle, a distributed computing cost of the set of distributed computing operations;
determining whether the distributed computing cost satisfies a threshold; and
based on a determination that the distributed computing cost satisfies the threshold, performing the set of distributed computing operations.

6. The method of claim 2, further comprising determining, using a machine learning model, an anomaly score based on a set of transaction records associated with the first user, wherein sending the URL comprises sending the URL based on a determination that the anomaly score satisfies an anomaly threshold.

7. The method of claim 2, further comprising:
sending, to a database, a query based on the target off-chain identifier to retrieve a set of linked records associated with the target off-chain identifier;
determining an anomaly score using a machine learning model based on transaction records of the set of linked records, wherein sending the URL comprises sending the URL based on a determination that the anomaly score satisfies an anomaly threshold.

8. The method of claim 2, wherein the signed message is a first message, further comprising:
determining whether a validation value of the second user is received by a time threshold; and
in response to a determination that the validation value is not received by the time threshold, submitting a second message indicating a transfer of the resource from the target blockchain address to the source blockchain address.

9. The method of claim 8, further comprising preventing additional resource transfers associated with resources of the target blockchain address.

10. A set of non-transitory, machine-readable media storing program instructions that, when executed by a set of processors, perform operations comprising:
receiving, from a first user device of a first user, a request indicating an off-chain identifier associated with a second user and a resource for the second user, wherein the resource indicates an amount;
retrieving a score associated with the first user from a database of scores;
determining a boundary based on the score, wherein a magnitude of the boundary is correlated with the score;
determining whether the amount is within the boundary;
generating and sending, to the second user, based on the request, a link that indicates (i) a signing application and (ii) an instruction to sign a code using a first key associated with a target blockchain address of a blockchain, wherein the generating the link comprises generating the link based on a determination that the amount satisfies the boundary;
obtaining, based on the link being activated at a second user device of the second user, a signed code via the signing application, the signed code being signed with the first key;
sending, based on authentication of the signed code, to a blockchain system, a signed message indicating a transfer of the resource from a source blockchain address to the target blockchain address; and
storing, based on the authentication of the signed code, the off-chain identifier and the target blockchain address in association with one another.

11. The set of non-transitory, machine-readable media of claim 10, wherein the signed message is a first message, the operations further comprising:
determining whether a user record of the first user indicates that the first user controls access to any blockchain addresses;
based on a determination that the first user is not indicated as controlling access to any blockchain addresses, sending a second message indicating a transfer of the resource to the source blockchain address before sending the first message.

12. The set of non-transitory, machine-readable media of claim 10, the operations further comprising:
determining whether the first user is indicated as being associated with any blockchain address of the blockchain; and
in response to a determination that the first user is not indicated as being associated with any blockchain address of the blockchain, selecting the source blockchain address of a plurality of available blockchain addresses.

13. The set of non-transitory, machine-readable media of claim 10, the operations further comprising:
obtaining user-related information about the second user from the first user;
determining whether the user-related information satisfies a set of security criteria, wherein sending the signed message comprises sending the signed message in response to a determination that the user-related information satisfies the set of security criteria.

14. The set of non-transitory, machine-readable media of claim 10, the operations further comprising determining whether the off-chain identifier is stored in a set of approved identifiers, wherein sending the link comprises sending the link in response to a determination that the off-chain identifier is not stored in the set of approved identifiers.

15. The set of non-transitory, machine-readable media of claim 10, wherein the request is a first request, further comprising:
receiving a second request indicating a second identifier;
determining whether the second identifier is stored in a list of forbidden identifiers; and
in response to a determination that the second identifier is stored in the list of forbidden identifiers, rejecting the second request.

16. The set of non-transitory, machine-readable media of claim 10, wherein storing the off-chain identifier and the target blockchain address in association with one another comprises:
determining the target blockchain address based on a public key;
encrypting the off-chain identifier to obtain an encrypted off-chain identifier; and
associating the encrypted off-chain identifier with the public key.

17. The set of non-transitory, machine-readable media of claim 10, wherein the off-chain identifier is a first off-chain identifier, further comprising generating the source blockchain address in association with the first user in response to receiving instructions to create a new account of the first user, wherein the instructions indicate a second off-chain identifier.

18. The set of non-transitory, machine-readable media of claim 10, wherein sending the signed message comprises:
updating a state of an on-chain application in response to receiving the signed code at an address of the on-chain application; and
sending the signed message via the on-chain application based on the state of the on-chain application.

19. The set of non-transitory, machine-readable media of claim 18, the operations further comprising:
sending a query to an identifier database storing registered identifiers to determine whether the off-chain identifier is associated with a known identifier of the identifier database; and
in response to a determination that the off-chain identifier is not associated with any known identifier of the identifier database, initializing the on-chain application.

* * * * *